US008577352B1

(12) United States Patent
Breiner

(10) Patent No.: US 8,577,352 B1
(45) Date of Patent: Nov. 5, 2013

(54) CONTROLLING USE OF WIRELESS COMMUNICATION DEVICES

(76) Inventor: Sheldon Breiner, Portola Valley, CA (US)

(*) Notice: Subject to any disclaimer, the term of this patent is extended or adjusted under 35 U.S.C. 154(b) by 208 days.

(21) Appl. No.: 12/931,908

(22) Filed: Feb. 14, 2011

Related U.S. Application Data

(60) Provisional application No. 61/337,966, filed on Feb. 12, 2010.

(51) Int. Cl.
*H04M 3/00* (2006.01)

(52) U.S. Cl.
USPC ........... 455/418; 455/41.2; 455/419; 455/420

(58) Field of Classification Search
USPC ................................. 455/418, 41.2, 419, 420
See application file for complete search history.

(56) References Cited

U.S. PATENT DOCUMENTS

| 2010/0210254 | A1* | 8/2010 | Kelly et al. | 455/418 |
| 2010/0233959 | A1* | 9/2010 | Kelly et al. | 455/41.2 |
| 2011/0009107 | A1* | 1/2011 | Guba et al. | 455/418 |

* cited by examiner

*Primary Examiner* — David Q Nguyen

(57) ABSTRACT

The use of a wireless control device (WCD) in a motor vehicle is detected by a local RF detector triggering (1) a COM COMPARE signal generated by a COM chip in the vehicle which is characteristic of that motor vehicle and which is transmitted almost simultaneously with (2) the WCD COMPARE signal which is also characteristic of the WCD then in that motor vehicle. The results of the time comparison of these two signals can be used by the WCD processing center to control the use of the WCD in the motor vehicle, for example, to prevent the WCD from sending and/or receiving text messages or limiting in certain ways the use of voice calls from a WCD in that vehicle at that time.

20 Claims, 1 Drawing Sheet

Time-Tagging Flow Chart

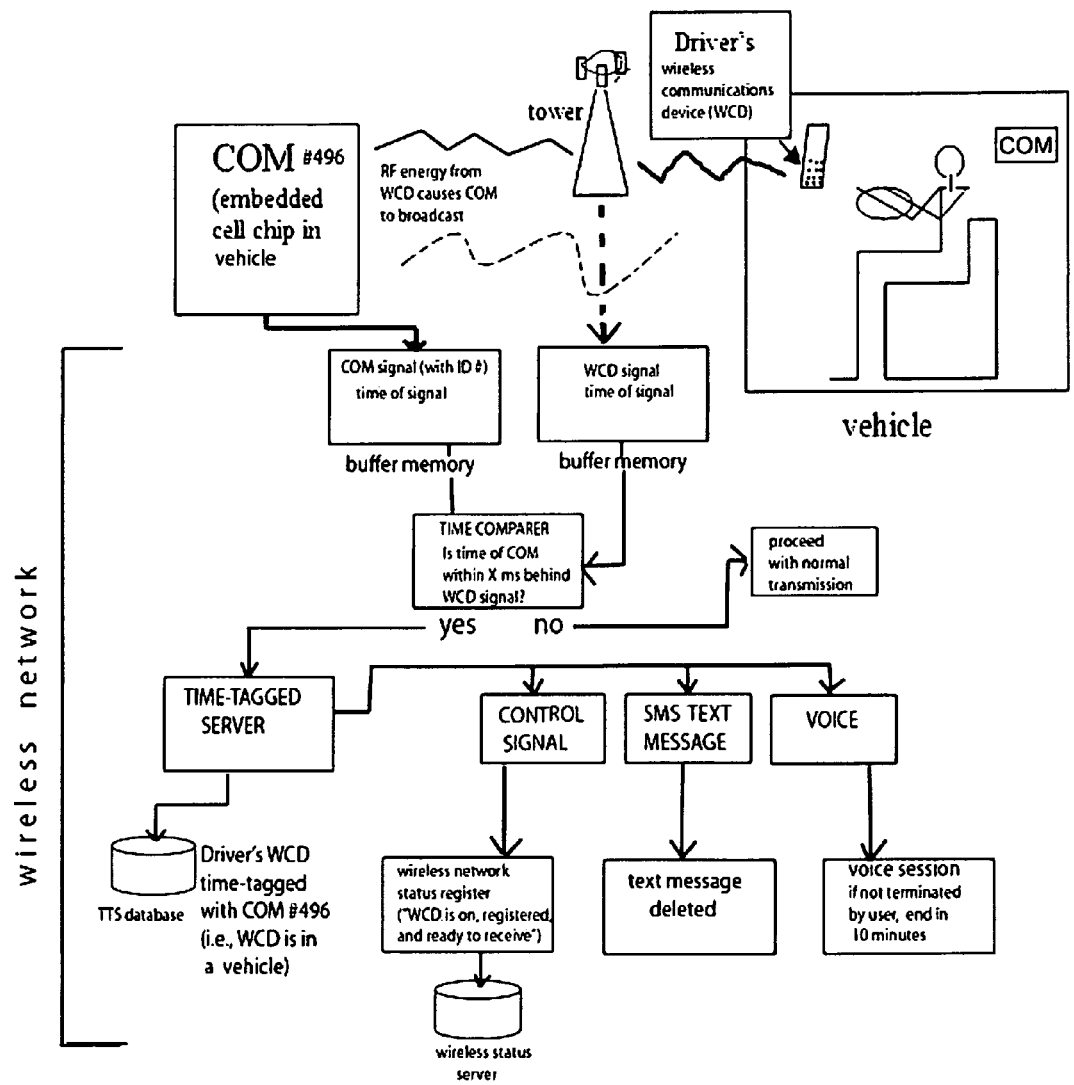
Time-Tagging Flow Chart

CONTROLLING USE OF WIRELESS COMMUNICATION DEVICES

CROSS-REFERENCE TO RELATED APPLICATION

This application claims priority from the provisional application No. 61/337,966, filed Feb. 12, 2010, by Sheldon Breiner and entitled System for Allowing Driver to Make Short Calls from a Cell Phone and Not Be Able to Send or Receive Text Messages. The provisional application filed Feb. 12, 2010, includes the text of, and incorporates by reference, the provisional application No. 61/337,394, filed Feb. 2, 2010 by Sheldon Breiner, the provisional application No. 61/336,580 filed Jan. 22, 2010, by Sheldon Breiner and entitled Systems for Blocking Text Messages Sent by Vehicle Driver. The provisional application filed Feb. 12, 2010, also includes the text of, and incorporates by reference, provisional patent application 61/271,170, filed Jul. 17, 2009, by Sheldon Breiner, Jeffrey Andrews and Timothy Hubert Paul Richardson. The entire disclosure of each of those four provisional applications is incorporated herein by reference for all purposes.

FIELD OF THE INVENTION

This invention relates to systems, methods and apparatus for controlling the use of a wireless communication device (WCD) in a motor vehicle.

BACKGROUND OF THE INVENTION

U.S. Pat. No. 7,541,914 (Breiner) and U.S. Pat. No. 6,225,897 (Doyle) disclose systems whose objective is to warn motorists that the driver of another vehicle is using a cell phone and is likely, therefore, to be distracted. The entire disclosure of each of those patents is incorporated herein by reference for all purposes. There remains a need for additional means for the controlling the use of wireless control devices (WCDs) in motor vehicles, including for example means for preventing drivers of motor vehicles from sending text messages, and means for limiting the duration of voice calls.

SUMMARY OF THE INVENTION

In a first aspect, this invention provides a method of identifying a WCD in a motor vehicle which comprises comparing (1) a COM COMPARE signal which is characteristic of a motor vehicle and (2) a WCD COMPARE signal which is characteristic of the WCD in the motor vehicle. The COM COMPARE signal can be characteristic of any motor vehicle, or characteristic of a defined category of motor vehicles, or characteristic of a particular motor vehicle. The COM COMPARE signal can be generated by any chip or like device, and can have a unique ID which identifies the motor vehicle in which it is positioned. The COM COMPARE signal can be a signal which is recognized by one or more wireless networks. The COM COMPARE signal can be generated by a COM chip which is activated wirelessly (for example by RF signals from the WCD) or which is directly activated by the WCD.

As is well known, a WCD can be switched on or switched off, and when a WCD is switched on, it can be in a standby mode or in a communication mode. When a WCD is in the standby mode, the WCD and the WCD processing center for the WCD periodically exchange a reverse control channel signal (or "handshake signal") which verifies that the WCD processing center is in contact with the WCD. The exchange takes place, for example, every 5-10 min. or so and when the WCD crosses a boundary between areas controlled by different cell towers of the WCD processing center. The term "incoming control signal" is used herein to denote a signal sent by the WCD processing center to the WCD. The term "outgoing control signal" is used herein to denote a signal sent by the WCD to the WCD processing center as part of the reverse control channel signal.

The COM COMPARE signal is preferably sent to the WCD processing center for the WCD, and the WCD processing center preferably compares the timing of the COM COMPARE signal and the timing of the WCD COMPARE signal. However, it is also possible for the COM COMPARE and WCD COMPARE signals to be sent (either directly or through the WCD processing center) to a different processing center where they are compared.

In one embodiment of the method, the WCD COMPARE signal is an outgoing control signal sent to the WCD processing center, and the COM COMPARE signal is generated after a defined delay following the sending of an outgoing control signal by the WCD. The COM COMPARE signal can for example be generated by a COM chip in response to the incoming control signal from the WCD processing center, or can be generated by a COM chip in response to an outgoing control signal or an RF signal associated with an outgoing control signal. The outgoing control signal used in the comparison can be the first outgoing control signal sent by the WCD after the WCD has been placed in the vehicle, or can be a subsequent outgoing control signal. The defined delay can be a very short time, e.g. a few tens of milliseconds.

In another embodiment, the WCD COMPARE signal is an initial communication signal which is generated when the WCD is first put into the communication mode, and the COM COMPARE signal is generated after a defined delay following the sending of an initial communication signal by the WCD. The COM COMPARE signal can for example be generated by a COM chip in response to RF characteristics of the signal generated when the WCD is first put into the communication mode. The defined delay can be a very short time (e.g. a few tens of milliseconds).

The comparison between the COM COMPARE and WCD COMPARE signals can comprise a comparison of the respective times at which the signals were sent, and can establish the delay between the two signals. In this way, even if the COM COMPARE signal is characteristic of any motor vehicle, the WCD processing center can recognize that the COM COMPARE signal comes from a WCD which is in the standby or communication mode in a vehicle. The recognition by the WCD processing center of the fact that the WCD is in a motor vehicle containing a COM chip can optionally be stored in a memory.

This recognition can then be used by the WCD processing center, either immediately or after it has been retrieved from the memory, to control the use of the WCD in the motor vehicle, e.g. to prevent the communication of text messages from the WCD to all recipients (or to identified recipients), and/or to prevent communication of text messages to the WCD from all senders (or from identified senders), and/or to prevent the communication of or limit the duration of voice messages between the WCD and all recipients (or identified recipients). In one embodiment of the invention, text messages to the WCD which are not delivered are sent to a memory from which the user of the WCD can retrieve them when the WCD is no longer in a vehicle. It is also technologically possible for text messages from the WCD which are not delivered to be sent to a memory from which they could be later released; however, this is highly undesirable because it would encourage the sending of text messages from WCDs in vehicles, in the knowledge that such text messages, even if not delivered immediately, would ultimately be delivered.

The generation of the COM COMPARE signal by the incoming or outgoing control signal can be done only once after the WCD has been switched on, or can be repeated after each outgoing control signal or after a predetermined number of incoming or outgoing control signals. When the COM COMPARE signal is generated repeatedly by outgoing control signals, the receipt by the WCD processing center of outgoing control signals, coupled with the absence of COM COMPARE signals I can be recognized by the WCD processing center as meaning that the WCD, although still switched on, is no longer in the motor vehicle.

In additional aspects, this invention provides systems and apparatus useful in the method of the invention, and for other purposes. For example, in one aspect, the invention provides a system which comprises (1) a WCD which (i) can be switched on or switched off, (ii) when it is switched on, can be in a standby mode or a communication mode, and (iii a) when it is in the standby mode, generates an outgoing control signal which is sent to a WCD processing center in response to an incoming signal received from the WCD processing center and which includes a starting time signal which is the time at which the outgoing control signal is sent, and/or (iii b) when it is placed in the communication mode generates a WCD COMPARE signal which is directed to a WCD processing center and which includes a starting time signal which is the time at which the WCD was first placed in the communication mode;

(2) a COM chip which (i) is in a motor vehicle, and (ii a) when a WCD is placed in the standby mode in the vehicle, generates a COM COMPARE signal after, preferably at a predetermined time after, the WCD has sent an outgoing control signal to a WCD processing center and/or (ii b) when a WCD is placed in the communication mode in the vehicle, generates a COM COMPARE signal after, preferably at a predetermined time after, the WCD has been placed in the communication mode.

In another aspect, this invention provides a system which comprises a motor vehicle which includes a COM chip which, (ii a) when a WCD is placed in the standby mode in the vehicle, generates a COM COMPARE signal after, preferably at a predetermined time after, the WCD has sent an outgoing control signal to a WCD processing center and/or (ii b) when a WCD is placed in the communication mode in the vehicle, generates a COM COMPARE signal after, preferably at a predetermined time after, the WCD has been placed in the communication mode.

In another aspect, this invention provides a system which comprises (1) a WCD processing center;
(2) a WCD which (i) is in a motor vehicle, (ii) can be switched on or switched off, (iii) when it is switched on, can be in a standby mode or a communication mode, and (iv a) when it is in the standby mode, generates an outgoing control signal which is sent to a WCD processing center in response to an incoming signal received from the WCD processing center and which includes a starting time signal which is the time at which the outgoing control signal is sent, and/or (iv b) when it is placed in the communication mode generates a WCD COMPARE signal which is directed to a WCD processing center and which includes a starting time signal which is the time at which the WCD was first placed in the communication mode;
(3) a COM chip which (i) is in the motor vehicle, and (ii a) when a WCD is placed in the standby mode in the vehicle, sends to the WCD processing center a COM COMPARE signal after, preferably at a predetermined time after, the WCD has sent an outgoing control signal to a WCD processing center and/or (ii b) when a WCD is placed in the communication mode in the vehicle, sends to the WCD processing center a COM COMPARE signal after, preferably at a predetermined time after, the WCD has been placed in the communication mode.
the WCD processing center comparing the starting time signal and the time at which the COM COMPARE signal is received.

BRIEF DESCRIPTION OF THE DRAWINGS

The invention is illustrated in the accompanying drawing, in which the FIGURE is a diagrammatic block diagram of one embodiment of the method of the invention.

DETAILED DESCRIPTION OF THE INVENTION

In the Summary of the Invention above, the Detailed Description of the Invention, and the claims below, and in the accompanying drawings, reference is made to particular features of the invention, including for example components, devices, apparatus, systems, and steps. It is to be understood that the disclosure of the invention in this specification includes all possible combinations of such particular features. For example, where a particular feature is disclosed in the context of a particular mode, aspect, embodiment, FIGURE or claim, that feature can also be used, to the extent possible, in the context of any other particular mode, aspect, embodiment, FIGURE or claim, and in the invention generally. The invention disclosed and claimed herein includes embodiments not specifically described herein and can for example make use of features which are not specifically described herein but which provide functions which are the same, equivalent or similar to, features specifically disclosed herein.

The term "comprises" and grammatical equivalents thereof are used herein to mean that other features are optionally present. For example, a device "comprising" (or "which comprises") components A, B and C can contain only components A, B and C, or can contain not only components A, B and C but also one or more other components. Where reference is made herein to a method comprising two or more defined steps, then, unless the context requires otherwise, the defined steps can be carried out in any order or simultaneously, and the method can include one or more other steps which are carried out before any of the defined steps, between two of the defined steps, or after all the defined steps. The term "at least" followed by a number is used herein to denote the start of a range beginning with that number (which may be a range having an upper limit or no upper limit, depending on the variable being defined). For example "at least 1" means 1 or more than 1. When, in this specification, a range is given as "(a first number) to (a second number)" or "(a first number)–(a second number)", this means a range whose lower limit is the first number and whose upper limit is the second number. For example, "0.5-3" means a range whose lower limit is 0.5, and whose upper limit is 3. The numbers given herein should be construed with the latitude appropriate to their context and expression. The terms "plural" and "plurality" are used herein to mean two or more. When reference is made herein to "a", "an", "one" or "the" feature, it is to be understood that, unless the context requires otherwise, there can be one or more than one such feature.

Where reference is made herein to two or more components (or parts or portions etc.), it is to be understood that the components can be, unless the context requires otherwise, separate from each other or integral parts of a single structure or a single component acting as the two or more specified components.

Where reference is made herein to a "chip", this includes any kind of microprocessor or integrated circuit.

Where reference is made herein to a wireless communication device (or WCD), this includes mobile telephones (also referred to herein as cell phones) and any other device for wirelessly sending and/or receiving messages generated by voice and/or by a keyboard.

When the WCD processing center receives substantially simultaneously a plurality of WCD COMPARE signals (which may or may not be from WCDs in motor vehicles) and/or a plurality of COM COMPARE signals from different vehicles, the correct pairing of WCD and COM signals may require additional information. Under these circumstances, it may be necessary for the WCD processing center to refer to information from earlier pairs of signals which are stored in its memory, or to await further pairs of signals that can be correctly associated with each other.

The various aspects of the invention described above can optionally be combined with the various measures disclosed in the patents incorporated by reference herein and/or the inventions described in the provisional applications incorporated by reference which make it apparent to drivers of other vehicles and/or to the driver using the WCD that the driver using the WCD is engaged in behavior which is likely to cause danger to the driver himself and/or to others.

Further information about exemplary embodiments of the invention is provided below.

Some embodiments of the present invention can prevent the sending and/or receiving of text messages while driving, and/or prevent or limit the duration of voice calls while driving. The signal envelopes of text messages, control signals and voice messages are very different. A WCD processing center can therefore distinguish between them without difficulty.

It is not possible, for technical and other reasons to control a driver's WCD directly in the vehicle if the WCD is a free-standing device. And, it has been shown that neither laws, nor enforcement of such laws, nor voluntary actions such as turning off one's WCD before entering the vehicle to drive it, are sufficiently effective in reducing accidents. Therefore, something else is required to achieve safety while yet maintaining some wireless connection with a person's daily life and its interpersonal communications. The purpose of passively identifying a driver-controlled WCD and subsequent handling of the calls (voice and/or texting) within the wireless network is to restrict in some ways some of the more distracting influences of a WCD when near the driver's seat and to do so in a manner that is low cost, not at the discretion of the driver (mandatory), technically invisible to the driver and, most important for acceptance, does not prohibit absolutely, the ability to use the WCD while driving, if only for short calls.

A WCD can be controlled from circuits within the wireless network, and those circuits can, therefore, be used to control use of the WCD. Using a vehicle-installed cell phone circuit such as used in the Aeris Microburst network, or some other cell phone on-a-chip, in either case, referred to as 'COM', the COM via technologies send out a message to a computer server that follows the initiation of the WCD call, generally by as short a time as possible, possibly a few tens of milliseconds. By comparing this precise call time in a database with a buffer memory or other such wireless network switch in the local region of the WCD, and correlating the times of the initiation of the WCD call with that of the COM call, it is possible to 'time-tag' the call from the WCD. Similar to the means described in the appended anti-texting disclosure below, this time tag would then be 'tracked', by computer code within the wireless network at the service provider computer server.

Controlling SMS Text Messages

In preferred embodiments, this invention controls, in a passive, low cost and acceptable way, the most dangerous aspect of using a WCD when driving, namely the sending (and preferably also of receiving, due to the pressure to respond in kind, immediately) SMS text messages.

In preferred embodiments of the invention, the control of text messages is achieved through 'time-tagging' calls and/or control signals from the driver's WCD and then using this tagging, or digital labeling, to mitigate the distracting problems. This time-tagging is accomplished by using the sensed RF signals from the driver's WCD to send out a coded signal from a cell phone chip embedded in the vehicle, referred to herein as the COM. The time-tagging, in turn, is directed, at first, to establishing a numerical tie, or association, between the driver's WCD and the COM and therefore the driver's WCD and the vehicle, that is, the cell phone the driver uses when driving. Then, once that WCD is so characterized, actions will be taken automatically within the wireless network to reduce or eliminate the problem. In other words, a WCD call tagged by a COM# means that this phone, for that call, should be controlled in some way—no texting, or limited voice call or keep track of too many voice calls, etc., whatever phone controls equal safety on the road.

Control signals can be useful as WCD COMPARE signals, as they occur every few tens of minutes all of the time. If there are many closely-spaced WCD COMPARE calls from different WCDs in a given cell or wireless region or dense urban area, it may be impossible to identify whether a particular WCD is in a vehicle (and it is of course important to avoid tagging a WCD which is not in a vehicle, for example, is in use in an office. Statistical time boundaries can be established to avoid such a problem, say within tens of milliseconds or so from the initiation time. However, it might take a plurality of control calls to ascertain acceptable accuracy. Also, there are times when a normal call is routed or held in a buffer for many seconds waiting for other signal bursts, not unlike Internet packet-switching procedures, and such tagging may require it to be aborted or calls tracked by their origination time so as to tie in more accurately with the time-associated COM COMPARE signal. Thus, it might require a number of control signals being closely followed by the COM COMPARE signal to achieve 'successful' tagging which when achieved, does not have to be repeated. In the time tagging server (TTS) database, the COM # is digitally bound to that WCD being used by that driver in that vehicle until and unless the driver changes phones or vehicles, when it would be correlated once again.

Allowing (Only) Short Calls while Driving it seems not to be realistic to prevent completely the use of WCDs by the drivers of motor vehicles. Therefore, one embodiment of the present invention allows short calls, but prevents longer calls (the shorter the calls, the lower the accident rate), and optionally limits the number of calls. The system utilizes one or more of an embedded RF pickup circuit, a length-of-call timer in the circuit, a COM circuit, use of time-tagging and call cut-off hosted at the wireless network, optionally using software that monitors usage if additional calls are attempted several times over a short time, and where the pattern is thus considered dangerous.

In some embodiments of the invention, there would be an initial predetermined window of time, predetermined on the basis of what is deemed necessary for a driver to convey or receive simple information by voice, say, two minutes, during which there would be no control operated by the WCD processor and optionally during which there would be no visible or audible indicators to the driver of the vehicle and/or to other drivers. After this window of time, for example, a light on the dash will begin to blink, getting brighter and/or blinking faster. This, 'nagging' light will reach a visible—and perhaps, a sound—crescendo at a time, perhaps ten minutes into this voice call, a time long enough to convey or receive information, but still short enough to prevent (hopefully) the driver from ceasing to pay attention to safe driving.

The timer will preferably be initiated by the vehicle circuit (from the sensed RF energy of the WCD). Meanwhile, either the WCD will already have been time-tagged by the COM, if the system is part of the above technology or will be time-tagged during the call to identify the WCD as one in a vehicle and therefore subject to the duration limits or a time-tagged process is initiated during the call by the means described. If the driver terminates the call before this ten-minute (or shorter or longer) opportunity window expires, no further action is required, including no need for time-tagging. But, if the driver is still engaged on the WCD, after this allowable time is up, the tagged voice connection of the WCD is terminated. If additionally used, the rapid blinking rate and intensity increases of the dash light that culminate in the call termination will have presented ample warning of the imminent cutoff of the voice connection and can be expected to result in behavioral change in a driver's tendency to use the phone while driving.

However, the call cannot be terminated by anything in the vehicle, at least not anything that would be generally acceptable to drivers. It is possible to utilize the time-tagging scheme above to associate the WCD with the fact that the call is coming from the driver of a vehicle. A COM signal would be sent immediately after the call is initiated, like the control signals and anti-texting schemes above. At the wireless network, it is possible to characterize this WCD call as ongoing longer, say, ten seconds and therefore a voice call. The correlation, i.e., tagging, can be established between the COM # in the TTS database and the WCD # by methods similar to that for the text and control signal analyses.

It is possible that a driver, immediately after a call was terminated, would place another call on the WCD, thus defeating the objective of allowing short, infrequent voice calls by a driver on a WCD. To counter this possibility and also to more efficiently change driver behavior in this regard, it would be possible to put some intelligent controls on the driver/caller's behavior by keeping track at the wireless network of such a single call (and, as described below, for repeated calls) as described above. Then, the driver/caller would, for example, not be allowed to place another such call for one hour or repeated calls in that day—or possibly over weeks that exhibit what might be judged as potentially distracted driving risks.

Identification of a driver having dangerous talking/driving behavior can be associated with the unique COM chip installed in the vehicle, so that the driver's habits are associated with that vehicle. Such association can be considered an appropriate basis for control of calling/driving and consequential driver calling behavior. Intelligence could be designed into the system to better achieve controls while still allowing the driver to make a certain amount of calls. Calls to an emergency number or to stored numbers considered emergency or service calls could be allowed.

The COM, preferably having a unique ID (effectively, a cell phone number) can be an important physical element of the invention. The COM can for example react to control signals and/or voice message signals being transmitted from a local WCD and can then be used to "tag" these types of signals. The tagging is accomplished by the timing of the signals to be transmitted by COM with respect to either control signals or voice messages, being separated by say, tens of milliseconds or such other very short interval. This is accomplished by using the sensing of transmissions of signals from the local WCD, and the immediate transmission of a short, identifiable—via unique ID of the COM—that follows the transmission of the control/texting signals. In effect, the COM signal 'piggybacks' on these other signals, timewise.

The COM signal can be directed to a file in a server where it can be retrieved by virtue of its two criteria, namely the ID and the time. The control and voice signals are, normally, passed along the network to some other locations for normal forwarding to their respective destinations: the controls to some alert file saying the WCD is on and ready for receipt of messages.

At this point, a process of analysis is employed to identify the control signal sent out by the WCD using the unique timing of the COM and its ID versus the control signal [the COM ID would exhibit such recognizable numerics or coding to further facilitate discrimination from coincidentally-time cell phone signals from, say, other cell phones. The discrimination might take the form of relative length of signals, recognition of the envelope of the message, or other differences between the two. The 'tagged' control signal would be allowed to register status of the WCD, or perhaps this will already have been done before it is analyzed. A text message from or to a tagged WCD will have been temporarily stored in a buffer, prior to its delivery to the onward-directing switch. If confirmed to be to or from a WCD which has been tagged by the above or equivalent analysis, it is deleted and not forwarded to the switch (or done after leaving the switch buffer, but before forwarding. That text message is thus terminated.

The temporary storage in the buffer, handling of the control signals, processing of the text message in or around the switch and, the remote possibility of having to pass all text messages in a short buffer to accomplish the above, are all facilitated in the processing facilities owned and managed by a wireless service provider or on common communication facilities. This scheme is merely technology independent of the dependence of cooperation by the wireless provider which, at first glance, might be considered unlikely to be acceptable to such service providers. However, the dangers of text messaging while driving are so great that cooperation by the wireless service providers is possible.

What is claimed is:

1. A method of identifying a wireless communication device (WCD) in a motor vehicle,
    the motor vehicle containing a COM chip which has a unique ID and which can send a COM COMPARE signal which is characteristic of the motor vehicle;
    the WCD being a device which (i) can receive an incoming control signal from a WCD processing center and (ii) can send to the WCD processing center, after a predetermined delay, a WCD COMPARE signal in response to the incoming control signal, the WCD COMPARE signal being characteristic of the WCD;
    the method comprising
    (A) receiving on the WCD an incoming control signal from the WCD processing center, (B) after step (A), sending, in response to the incoming control signal, a WCD COMPARE signal from the WCD, the WCD COMPARE signal including a WCD COMPARE starting time signal which is the time at which the WCD COMPARE signal was sent, (C) after step (B), and after a predetermined delay, sending a COM COMPARE signal from the COM chip to the WCD processing center, the COM COMPARE signal including a COM COMPARE starting time signal which is the time at which the COM COMPARE signal was sent, (D) comparing the COM COMPARE starting time and the WCD COMPARE starting time, thus identifying that the WCD is in the motor vehicle, and (E) storing the identification of the WCD in memory in the WCD processing center.

2. A method according to claim 1 wherein the WCD processing center prevents the communication of text messages from and to the identified WCD.

3. A system which comprises
(1) a wireless communication device (WCD) which is in a motor vehicle and a which (i) can be switched on or switched off, (ii) when it is switched on, can be in a standby mode or a communication mode, and (iii) when it is in the standby mode and receives an incoming control signal from a WCD processing center, sends, in response to the incoming control signal, a WCD COMPARE signal which is characteristic of the WCD and which is sent to the WCD processing center, the WCD COMPARE signal including a WCD COMPARE starting time signal which is the time at which the WCD COMPARE signal was sent;
(2) a COM chip which (i) has a unique ID, and (ii) is in the motor vehicle, and (iii) after the WCD in the vehicle has sent a WCD COMPARE signal, sends COM COMPARE signal, the COM COMPARE signal being characteristic of the motor vehicle and including a starting time signal which is the time at which the COM COMPARE signal was sent.

4. A system according to claim 3 wherein there is a predetermined time between the WCD COMPARE starting time and the COM COMPARE starting time.

5. A system according to claim 3 wherein the WCD COMPARE starting time and the COM COMPARE starting time are compared, and the comparison identifies the WCD as the WCD in the vehicle containing the COM chip.

6. A system according to claim 3 wherein a single result of comparing the WCD COMPARE starting time and the COM COMPARE starting time is not sufficient to identify the WCD as the WCD is in the vehicle containing the COM chip, and the system compares that single result with earlier pairs of signals which are stored in a memory or with later comparisons of pairs of signals to identify that the WCD is the WCD in the vehicle containing the COM chip.

7. A system according to claim 5 which includes a WCD processing center
(i) which sends the incoming control signals to the WCD in the vehicle,
(ii) which contains, or to which is sent, the comparison which identifies the WCD as the WCD which is in the vehicle, and
(iii) which stores in memory the identification of the WCD in the vehicle.

8. A system according to claim 7 wherein the WCD COMPARE starting time and the COM COMPARE starting time are compared at the WCD processing center.

9. A system according to claim 7 wherein the WCD COMPARE starting time and the COM COMPARE starting time are compared at a processing center different from the WCD processing center, and the identification of the WCD in the vehicle is sent to the WCD processing center and stored in memory in the WCD processing center.

10. A system according to claim 7 wherein the WCD processing center receives a text message which is sent from the WCD in the vehicle for delivery to an intended recipient and deletes the message without delivering it to the intended recipient.

11. A system according to claim 10 wherein the WCD processing center receives a text message which is intended for delivery to the WCD in the vehicle and does not deliver the text message to the WCD in the vehicle.

12. A system according to claim 11 wherein the WCD processing center sends to a memory any text message which is intended to be sent to the WCD while the WCD is in the vehicle, and the WCD processing center, after cessation of the COM COMPARE signals signifies that the WCD is no longer in the vehicle, permits access of the WCD to the memory containing the text message.

13. A system according to claim 10 wherein the WCD processing center controls voice information transmitted to and from the WCD in the vehicle.

14. A system for preventing the delivery of text messages from a wireless communication device (WCD) which is in a motor vehicle,
wherein the WCD
(i) is in the motor vehicle,
(ii) can be switched on or switched off,
(iii) when it is switched on, can be in a standby mode or a communication mode, and
(iv) when it is switched on and is in the standby mode receives intermittent incoming control signals from a WCD processing center, and, after a predetermined delay after each time that it receives an incoming control signal, sends to the WCD processing center a WCD COMPARE signal which is characteristic of the WCD and which includes a WCD COMPARE starting time which is the time at which the WCD COMPARE signal was sent;
wherein the vehicle contains a COM chip which
(i) has a unique identity,
(ii) senses when the WCD sends the WCD COMPARE signal,
(iii) sends a COM COMPARE signal at a predetermined time after the WCD has sent a WCD COMPARE signal to the WCD processing center, the COM COMPARE signal (a) being characteristic of the vehicle which includes the COM chip and (b) including a COM COMPARE starting time which is the time at which the COM COMPARE signal was sent;
the method comprising the steps of
(A) comparing the WCD COMPARE starting time and the COM COMPARE starting time, thus identifying that the WCD is in the vehicle containing the COM chip,
(B) after step (A), storing the identification of the WCD in memory in the WCD processing center, and
(C) after step (B), using the WCD processing center to prevent the communication of text messages from and to the identified WCD.

15. A system according to claim 14 wherein the WCD COMPARE signal and the COM COMPARE signal are sent to the WCD processing center.

16. A system according to claim 14 wherein step (A) is carried out at the WCD processing center.

17. A system according to claim 14 wherein the COM COMPARE signal is sent to a second processing center which is not the WCD processing center.

18. A system according to claim 17 wherein step (A) is carried out at the second processing center.

19. A system according to claim 14 wherein the WCD processing center recognizes, when the intermittently sent WCD COMPARE signal is no longer followed by a COM COMPARE signal, that the WCD is no longer in the vehicle.

20. A system according to claim 19 which stores in memory text messages received for delivery to the WCD while the WCD is in the vehicle, and permits access of the WCD to the memory containing the text messages after the WCD processing center has recognized that the WCD is no longer in the vehicle.

\* \* \* \* \*